(12) United States Patent
Skogward et al.

(10) Patent No.: US 6,338,286 B1
(45) Date of Patent: Jan. 15, 2002

(54) CONTROL DEVICE

(75) Inventors: Kenneth Skogward, Huskvarna (SE); Hans Peter Havdal, Kongsberg (NO)

(73) Assignee: Kongsberg Automotive ASA (NO)

( * ) Notice: Subject to any disclaimer, the term of this patent is extended or adjusted under 35 U.S.C. 154(b) by 0 days.

(21) Appl. No.: 09/446,624

(22) PCT Filed: Jun. 26, 1998

(86) PCT No.: PCT/SE98/01278

§ 371 Date: Mar. 10, 2000

§ 102(e) Date: Mar. 10, 2000

(87) PCT Pub. No.: WO99/00616

PCT Pub. Date: Jan. 7, 1999

(30) Foreign Application Priority Data

Jun. 27, 1997 (SE) .............................. 9702510

(51) Int. Cl.$^7$ .............................. B60K 17/10
(52) U.S. Cl. .............................. 74/473.11; 74/473.21; 74/335; 60/591; 60/594
(58) Field of Search .............................. 74/473.11, 473.21, 74/473.23, 335; 60/571, 590, 591, 594

(56) References Cited

U.S. PATENT DOCUMENTS 2,079,684 A * 5/1937 Church .............................. 74/346
3,991,845 A * 11/1976 LaPointe .............................. 74/473.11
4,287,784 A * 9/1981 Cedendahl .............................. 74/473.11
5,481,877 A 1/1996 Bakke et al.
5,623,852 A 4/1997 Tischer et al.

FOREIGN PATENT DOCUMENTS

| DE | 43 20 353 A1 | | 1/1994 |
|----|--------------|---|--------|
| DE | 44 08 209 | * | 9/1994 |
| EP | 0 179 951 A1 | | 5/1986 |
| GB | 2 302 573 A | | 1/1997 |

* cited by examiner

Primary Examiner—David A. Bucci
Assistant Examiner—William C Joyce
(74) Attorney, Agent, or Firm—Lerner, David, Littenberg, Krumholz & Mentlik, LLP

(57) ABSTRACT

Apparatus for controlling the gears of a motor vehicle comprising a pivotable gear lever for pivoting between gear positions corresponding to the gear positions for the motor vehicle transmission, a primary hydraulic piston/cylinder arrangement coupled to the gear lever, a secondary hydraulic piston/cylinder arrangement coupled to the gearbox of the motor vehicle, and a hydraulic circuit hydraulically communicating with the primary and secondary hydraulic piston and cylinder arrangements and including a flow limiter valve with an open position in which the hydraulic flow in the hydraulic circuit is not limited and a plurality of closed positions for controllably limiting the hydraulic flow in the hydraulic circuit whereby movement between the various gear positions for the motor vehicle is controlled.

6 Claims, 2 Drawing Sheets

CONTROL DEVICE

CROSS-REFERENCE TO RELATED APPLICATION

This application claims the benefit of Swedish Patent Application No. 9702510-0, filed Jun. 27, 1997.

FIELD OF THE INVENTION

The present invention relates to a maneuvering apparatus comprising a gear lever and at least one pivot hinge by means of which the gear lever is articulated relative to a console for switching between a number of gear positions, the gear positions of the gear lever about the pivot hinge being intended to be converted into gear positions of an automatic transmission in a motor vehicle.

BACKGROUND OF THE INVENTION

Gear controls for automatic transmissions have used mechanical means for transmitting gear movements between the gear controls and the gearbox. The mechanical means are either designed as wire controls or as link brackets. These devices have certain limitations in terms of the way these movement-transmitting components are arranged, which takes up space in order for the components to be protected against soiling and damage.

An object of the present invention is to provide a transmission of the gear change movements of the gear lever to the gearbox in a distinct and reliable manner.

SUMMARY OF THE INVENTION

In accordance with the present invention, this and other objects have now been realized by the invention of apparatus for controlling the gears of a motor vehicle having a transmission including a gear box comprising a pivotable gear lever for pivoting between a plurality of gear positions corresponding to a plurality of gear positions for the transmission, hydraulic motion transmitting means for hydraulically transmitting motion between the gear lever and the gearbox, the hydraulic motion transmitting means comprising at least one primary hydraulic member mechanically coupled to the gear lever, at least one secondary hydraulic member mechanically coupled to the gearbox, and a hydraulic circuit hydraulically communicating with the at least one primary hydraulic member and the at least one secondary hydraulic member, the hydraulic circuit including a controllable flow limiter having an open position in which the hydraulic flow in the hydraulic circuit is not limited thereby and a plurality of closed positions for controllably limiting the hydraulic flow in the hydraulic circuit, whereby the movement between the plurality of gear positions for the motor vehicle transmission are controlled. In a preferred embodiment, the apparatus includes pressure sensor means for sensing the pressure in the hydraulic circuit, whereby the controllable flow limiter can be controlled by the pressure sensed by the pressure sensor means. In a preferred embodiment, the application of a predetermined force to the pivotable gear lever creates a predetermined pressure in the hydraulic circuit, and the controllable flow limiter is adapted to be in the open position when the predetermined pressure is exceeded.

In accordance with one embodiment of the apparatus of the present invention, the apparatus includes at least one position sensor for sensing the position of the pivotable gear lever, and wherein the controllable flow limiter is controllable by means of the at least one position sensor.

In accordance with another embodiment of the apparatus of the present invention, the at least one primary hydraulic member comprises a first primary hydraulic member and including a second primary hydraulic member, the first primary hydraulic member comprising a first piston in a first cylinder, and the second primary hydraulic member comprising a second piston in a second cylinder, a lifting rod pivotably attached to the pivotable gear lever at a pivot point, the lifting rod including first and second arms extending from either side of the pivot point whereby the lifting rod can pivot along with the pivotable gear lever, the first piston connected to the first arm and the second piston connected to the second arm.

In accordance with a preferred embodiment of the apparatus of the present invention, the hydraulic circuit comprises a first hydraulic circuit, and including a second hydraulic circuit disposed in parallel with the first hydraulic circuit, the controllable flow limiter comprising a first controllable flow limiter, the second hydraulic circuit including a second controllable flow limiter for controllably limiting the hydraulic flow in the second hydraulic circuit, the second hydraulic circuit including at least one cylinder and a spring return piston disposed therein, the second controllable flow limiter adapted to cooperate with the first controllable flow limiter whereby the plurality of gear positions can be switched between a normal gear change mode and an alternate gear change mode in which the pivotable gear lever can be switched from a neutral position to a gear change position wherein the pivotable gear lever can spring back to the neutral position. Preferably, the at least one cylinder and spring return piston disposed in the second hydraulic circuit comprises a first cylinder and spring return piston, and including a second cylinder and spring return piston disposed in the second hydraulic circuit, the first and second cylinders and spring return pistons being disposed in parallel circuits and including pistons facing in opposite directions whereby the piston of the first cylinder and spring return piston is spring loaded counter to the first primary hydraulic member and the piston of the second cylinder and spring return piston is spring loaded counter to the second primary hydraulic member.

The objects of the present invention are achieved by means of maneuvering apparatus consisting of a hydraulics system with at least one primary hydraulic component which is mechanically coupled to the gear lever, and at least one secondary hydraulic component which is mechanically coupled to the gearbox and is arranged to communicate with the primary hydraulic component by means of a hydraulic circuit in which there is arranged a controllable flow limiter for the hydraulic flow, by which means the gear positions and existing catch positions are created.

BRIEF DESCRIPTION OF THE DRAWINGS

The present invention will be described in greater detail in the following detailed description, with reference to the attached drawings, in which.

DETAILED DESCRIPTION

The present invention uses a hydraulic transmission system for transmitting the gear change movements of a gear control in a motor vehicle to the gearbox, and it thus includes at least one controllable flow limiter which is used to define the gear positions.

Figure 1:
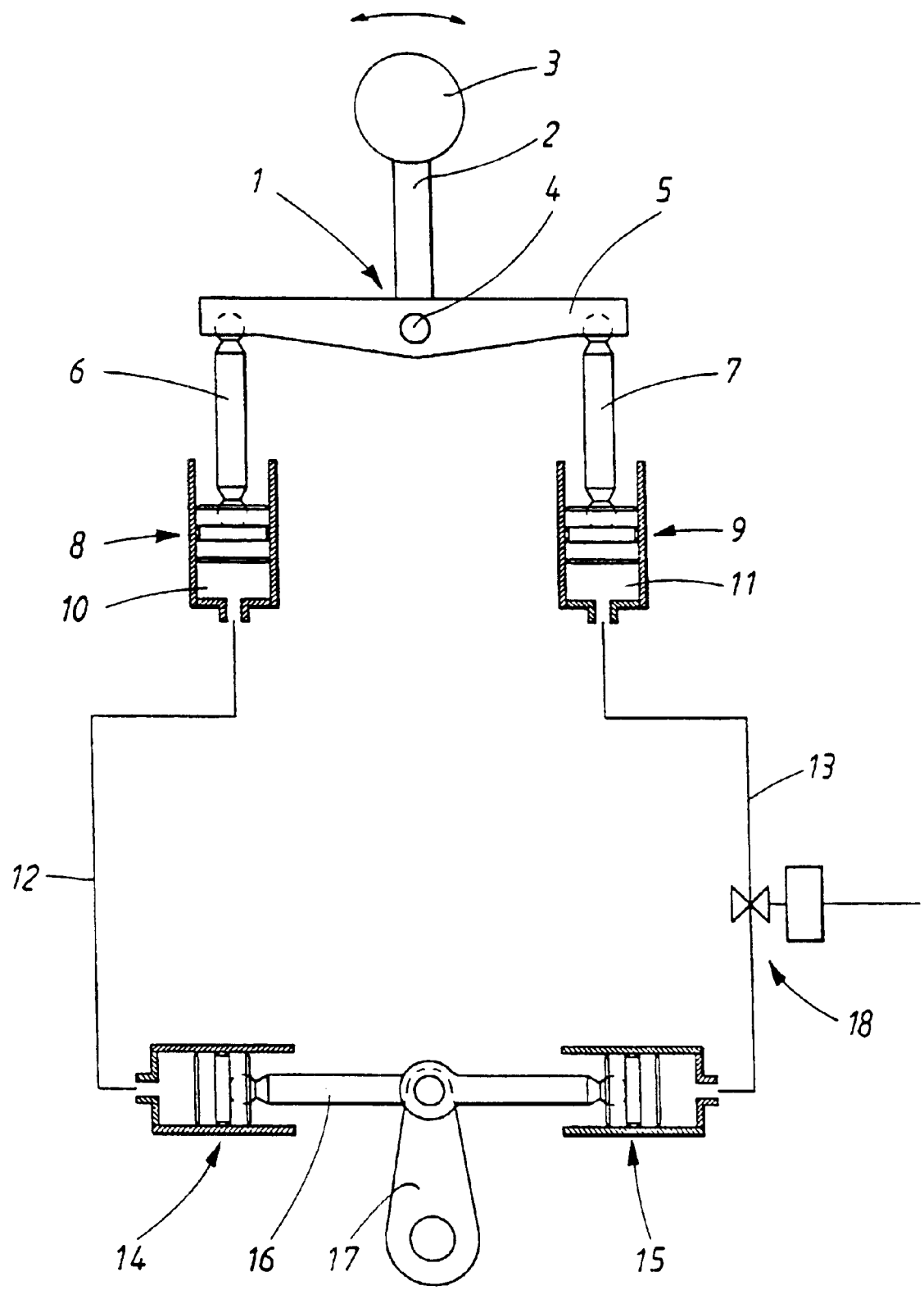
FIG. 1 is a diagrammatic representation of the basic elements of the present invention.

Turning to the Figures, FIG. 1 shows a maneuvering apparatus with a gear control 1 shown purely diagrammatically, with a gear lever 2 and a lever knob 3 which is intended to be gripped by the driver for pivoting the gear lever relative to a maneuvering console (not shown). The gear lever is pivotably mounted about a pivot hinge 3, which defines at least one pivot axis which, in the example shown, extends at right angles to the plane of the paper. The gear control has a mechanism for converting the pivot movements of the lever into forward and backward movements by means of the fact that the lever is rigidly connected to a two-armed lifting rod 5. Push rods, 6 and 7, are coupled to its ends, these rods being in the form of piston rods belonging to the hydraulic primary piston cylinders, 8 and 9, which form part of a hydraulic transmission apparatus for transmitting the mechanical pivoting movements of the gear lever. The piston cylinders, 8 and 9, communicate by means of their respective cylinder chambers, 10 and 11, and through the respective hydraulic lines, 12 and 13, with the respective hydraulic secondary piston cylinders, 14 and 15 which, by means of link arms, 16 and 17, create the necessary gear change movement for switching the gearbox between defined gear change positions. According to the present invention, at least one hydraulic line has a flow limiter 18 in the form of a controllable valve which, by means of a control unit, for example the main computer of the vehicle, can be controlled for controlling the movement pattern of the gear lever with respect to catch functions, i.e. blocking of the gear lever against movements, but also definition of gear positions by creating a resistance that has to be overcome for moving the gear lever between the gear positions. This resistance can, for example, be different between different positions, for example the resistance can be increased between a neutral position and a reverse position in order to avoid unintentional gear movement. Pressure sensors, 30 and 31, are arranged to detect the pressure in each of the hydraulic lines, 12 and 13, which pressure depends on the force applied to the maneuvering lever 3. By means of a control unit 23 in the form of a computer, the flow limiter 18 is controlled so as to open when a certain maneuvering force has been reached.

The flow limiter 18 can also be used to define the positions of the secondary piston cylinders, 14 and 15 and thus the gear positions in the gearbox. In these positions, the flow limiter 18 is kept fully closed, and it therefore blocks the hydraulic fluid completely. Blocking at one point thus blocks the entire hydraulics system and thus the entire gear change system.

Figure 2:
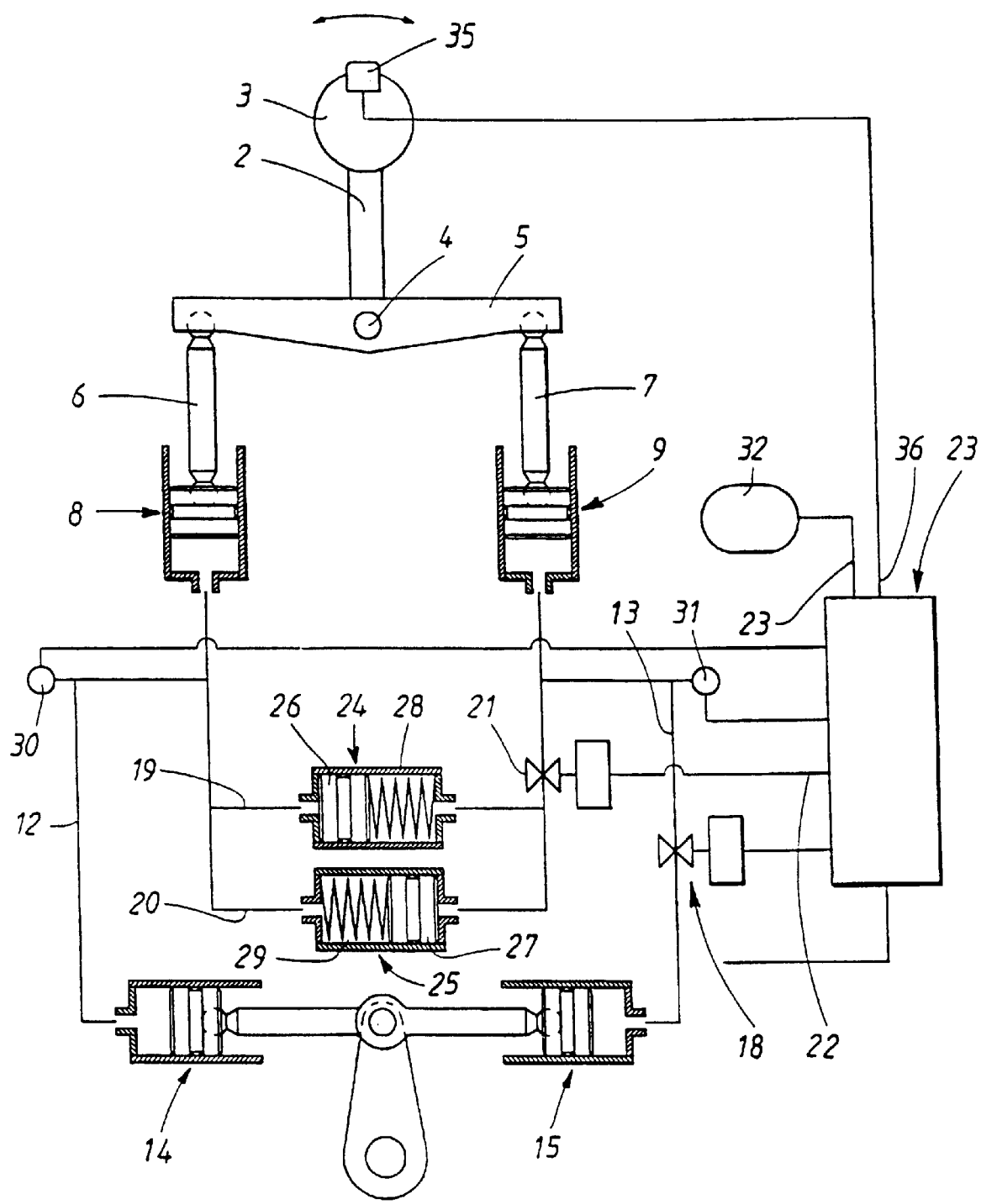
FIG. 2 is a diagrammatic representation of another embodiment of the present invention with a certain type of gearbox.

FIG. 2 shows an embodiment of the maneuvering apparatus which is provided with an alternative gear change mode in the form of a swivel position to which the gear lever can be switched. The latter is thus swiveled from a neutral position to a position for electrically changing the gear upwardly for each swivel stage and to a position for changing the gear downwardly for each swivel stage. The gear lever springs back to the neutral position.

For this purpose, the system according to FIG. 1 is additionally provided with two mutually parallel hydraulic circuits, 19 and 20, which are coupled in parallel to the main circuit, which is represented by the flow lines, 12 and 13. The two parallel circuits, 19 and 20, can be coupled and uncoupled simultaneously by means of the flow limiter 18 on the one hand, and a switching valve 21 on the other hand, which valve can be controlled from an output 22 of the control unit 23. The two parallel circuits, 19 and 20, each have hydraulic piston cylinders, 24 and 25, which each have a piston, 26 and 27, which is spring-loaded in the opposite direction, i.e. a compression spring 28 in the hydraulic cylinder 24 seeks to press the piston 26 in one direction, and a spring 29 in the other piston cylinder 25 is arranged to press the piston 27 in the opposite direction. During the swivel function, the flow limiter 18 is kept closed and the flow limiter 21 is at least partially open in order to control the flow between the primary piston cylinders, 8 and 9, and the parallel hydraulic circuits, 19 and 20.

The apparatus also includes position sensors 32 which are arranged, for example, on the lever in order to detect the position of the lever along the fixed path of movement of the lever. Information concerning the position of the lever is fed to an input 33 of the control unit 23 in order to create, by means of the latter, a control signal at an output 22 for controlling the flow limiter 18. The latter can be controlled in a fully analog manner or in smaller stages by means of digital control, so that the flow limiter 18 can create the desired limitation of movement of the gear lever 2 either in the form of a complete block or a limited resistance that is overcome by increased lever force. The flow limiter 18 can also be adjusted by means of an electrical switch 35 which is arranged on the lever knob 3 and which, by means of an input 36 to the control unit 23, can create a releasable blocking, for example between a neutral position and a reverse position. Correspondingly, a so-called key lock function can also be obtained by electrical indication of the ignition key position in the ignition lock, in order to ensure that the lever is, for example, in the park position before the ignition is turned off or the key removed.

The position sensors 32 can either be angle sensors or linear sensors, depending on which movement is to be detected. The position sensor 32 additionally detects when the lever 2 is in the alternative gear change mode and detects which of the positions within this mode the lever is located, i.e. the neutral position, or swivel forwards or backwards. This is used for electrical control of the gearbox in a known manner.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for controlling the gears of a motor vehicle having a transmission including a gear box comprising a pivotable gear lever for pivoting between a plurality of gear positions corresponding to a plurality of gear positions for said transmission, hydraulic motion transmitting means for hydraulically transmitting motion between said gear lever and said gearbox, said hydraulic motion transmitting means comprising at least one primary hydraulic member mechanically coupled to said gear lever, at least one secondary hydraulic member mechanically coupled to said gearbox, and a hydraulic circuit hydraulically communicating with said at least one primary hydraulic member and said at least one secondary hydraulic member, said hydraulic circuit including a controllable flow limiter having an open position in which the hydraulic flow in said hydraulic circuit is not limited thereby and a plurality of closed positions for controllably limiting the hydraulic flow in said hydraulic circuit, whereby the movement between said plurality of gear positions for said motor vehicle transmission are controlled, wherein said at least one primary hydraulic member comprises a first primary hydraulic member and including a second primary hydraulic member, said first primary hydraulic member comprising a first piston in a first cylinder, and said second primary hydraulic member comprising a second piston in a second cylinder, and a lifting rod pivotably attached to said pivotable gear lever at a pivot point, said lifting rod including first and second arms extending from either side of said pivot point whereby said lifting rod can pivot along with said pivotable gear lever, said first piston connected to said first arm and said second piston connected to said second arm.

2. The apparatus of claim 1, including pressure sensor means for sensing the pressure in said hydraulic circuit, whereby said controllable flow limiter can be controlled by pressure sensed by said pressure sensor means.

3. The apparatus of claim 2, wherein the application of a predetermined force to said pivotable gear lever creates a predetermined pressure in said hydraulic circuit, and wherein said controllable flow limiter is adapted to be in said open position when said predetermined pressure is exceeded.

4. The apparatus of claim 1, including at least one position sensor for sensing the position of said pivotable gear lever, and wherein said controllable flow limiter is controllable by means of said at least one position sensor.

5. The apparatus of claim 1, wherein said hydraulic circuit comprises a first hydraulic circuit, and including a second hydraulic circuit disposed in parallel with said first hydraulic circuit, said controllable flow limiter comprising a first controllable flow limiter, said second hydraulic circuit including a second controllable flow limiter for controllably limiting the hydraulic flow in said second hydraulic circuit, said second hydraulic circuit including at least one cylinder and a spring return piston disposed therein, said second controllable flow limiter adapted to cooperate with said first controllable flow limiter whereby said plurality of gear positions can be switched between a normal gear change mode and an alternate gear change mode in which said pivotable gear lever can be switched from a neutral position to a gear change position wherein said pivotable gear lever can spring back to said neutral position.

6. The apparatus of claim 5, wherein said at least one cylinder and spring return piston disposed in said second hydraulic circuit comprises a first cylinder and spring return piston, and including a second cylinder and spring return piston disposed in said second hydraulic circuit, said first and second cylinders and spring return pistons being disposed in parallel circuits and including pistons facing in opposite directions whereby said piston of said first cylinder and spring return piston is spring loaded counter to said first primary hydraulic member and said piston of said second cylinder and spring return piston is spring loaded counter to said second primary hydraulic member.

\* \* \* \* \*

UNITED STATES PATENT AND TRADEMARK OFFICE
CERTIFICATE OF CORRECTION

PATENT NO.    : 6,338,286 B1                                       Page 1 of 1
DATED         : January 15, 2002
INVENTOR(S)   : Kenneth Skogward and Hans P. Havdal It is certified that error appears in the above-identified patent and that said Letters Patent is hereby corrected as shown below:

Column 5,
Line 17, before "pressure" (first occurrence) insert -- said --.

Signed and Sealed this

Thirteenth Day of August, 2002

Attest:

Attesting Officer

JAMES E. ROGAN
Director of the United States Patent and Trademark Office